US011845493B1

(12) United States Patent
Hickey (10) Patent No.: US 11,845,493 B1
(45) Date of Patent: Dec. 19, 2023

(54) BODY STRUCTURE FOR VEHICLE HAVING REINFORCEMENT ASSEMBLY

(71) Applicant: Ford Global Technologies, LLC, Dearborn, MI (US)

(72) Inventor: Joseph Prescott Hickey, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/825,124

(22) Filed: May 26, 2022

(51) Int. Cl.
*B62D 25/04* (2006.01)
*B62D 21/15* (2006.01)

(52) U.S. Cl.
CPC ............ *B62D 25/04* (2013.01); *B62D 21/157* (2013.01)

(58) Field of Classification Search
CPC ......... B62D 25/04; B62D 25/06; B62D 25/02
USPC ..... 296/210, 203.01, 203.03, 29, 30, 193.06
See application file for complete search history.

(56) References Cited

U.S. PATENT DOCUMENTS

| 6,666,500 | B2 | 12/2003 | Polzer et al. |
| 9,162,711 | B2 | 10/2015 | Yasukata et al. |
| 10,577,022 | B2 * | 3/2020 | Harrison ................ B62D 65/02 |
| 2012/0313400 | A1 | 12/2012 | Balzer et al. |

FOREIGN PATENT DOCUMENTS

DE          102004029278          1/2006

* cited by examiner

*Primary Examiner* — Dennis H Pedder
(74) *Attorney, Agent, or Firm* — Burris Law, PLLC (57) ABSTRACT

A body structure for a vehicle includes a roof side rail assembly, a vehicle pillar, a pillar reinforcement bracket and an intermediate reinforcement bracket. The roof side rail assembly includes an attachment plate and a rail secured to the attachment plate and configured to extend along a length of the vehicle. The vehicle pillar extends downward from the attachment plate. The pillar reinforcement bracket is secured to the rail and at least partially disposed within the vehicle pillar. The pillar reinforcement bracket includes a lower portion. The intermediate reinforcement bracket is disposed within and secured to the vehicle pillar. The intermediate reinforcement bracket also includes a connecting wall that is secured to the lower portion of the pillar reinforcement bracket. The connecting wall extends parallel to a surface of the attachment plate where the rail is secured to the attachment plate.

20 Claims, 8 Drawing Sheets

BODY STRUCTURE FOR VEHICLE HAVING REINFORCEMENT ASSEMBLY

FIELD

The present disclosure relates to a body structure for a vehicle having a reinforcement assembly and a vehicle including a body structure having a reinforcement assembly.

BACKGROUND

The statements in this section merely provide background information related to the present disclosure and may not constitute prior art.

Vehicles such as sport utility vehicles and pick-up trucks, for example, include both a front door and a rear door on one side of the vehicle, and are designed to carry multiple occupants. Such vehicles also include vehicle pillars (e.g., A pillars, B pillars, and C pillars) that support the vehicle and add structural integrity to the vehicle such as a roof of the vehicle. Some vehicles include pillar reinforcements that are associated with the vehicle pillars and add further structural integrity to the vehicle. The present disclosure addresses potential challenges regarding conventional reinforcements.

SUMMARY

This section provides a general summary of the disclosure and is not a comprehensive disclosure of its full scope or all of its features.

The present disclosure provides a body structure comprising a reinforcement assembly that transfers loads to a vehicle pillar during operation of a vehicle.

In one form, the present disclosure provides a body structure for a vehicle that includes a roof side rail assembly, a vehicle pillar, a pillar reinforcement bracket and an intermediate reinforcement bracket. The roof side rail assembly includes an attachment plate and a rail secured to the attachment plate and configured to extend along a length of the vehicle. The vehicle pillar extends downward from the attachment plate. The pillar reinforcement bracket is secured to the rail and at least partially disposed within the vehicle pillar. The pillar reinforcement bracket includes a lower portion. The intermediate reinforcement bracket is disposed within and secured to the vehicle pillar. The intermediate reinforcement bracket also includes a connecting wall that is secured to the lower portion of the pillar reinforcement bracket. The connecting wall extends parallel to a surface of the attachment plate where the rail is secured to the attachment plate.

In variations of the body structure of the above paragraph, which may be implemented individually or in any combination: the vehicle pillar comprises an outer shell and an inner shell, the rail is spaced apart from the outer shell; the outer shell comprises a body and a pair of outer shell flanges extending from the body; the inner shell comprises a body and a pair of inner shell flanges extending from the body; the intermediate reinforcement bracket comprises a pair of bracket flanges extending from the connecting wall, the pair of bracket flanges disposed between and fixed to the pair of inner shell flanges and the pair of outer shell flanges; the pillar reinforcement bracket is secured to an outboard side of the rail, the intermediate reinforcement bracket comprises one or more flanges extending from the connecting wall and secured to the outer shell; the pillar reinforcement bracket further comprises a body and an upper portion, the upper portion extends outward from a first end of the body and the lower portion extends inward from a second end of the body; the lower portion extends inward at an obtuse angle relative to the body; the body is tapered from the first end toward the second end; the vehicle pillar is a B-pillar; the rail is a tubular member having a triangular shape; and the rail is a tubular member comprising an inboard side and an outboard side, the inboard side is secured to the attachment plate and the outboard side is secured to the pillar reinforcement bracket.

In another form, the present disclosure provides a body structure for a vehicle that includes a roof side rail assembly, a vehicle pillar, a pillar reinforcement bracket and an intermediate reinforcement bracket. The roof side rail assembly includes an attachment plate and a tubular rail secured to the attachment plate and configured to extend along a length of the vehicle. The vehicle pillar extends downward from the attachment plate. The pillar reinforcement bracket is at least partially disposed within the vehicle pillar and comprises an upper portion, a body, and a lower portion. The upper portion extends from the body and is secured to the tubular rail. The lower portion extends from the body at an obtuse angle. The intermediate reinforcement bracket is disposed within and is secured to the vehicle pillar. The intermediate reinforcement bracket comprises a connecting wall that is secured to the lower portion of the pillar reinforcement bracket. The connecting wall extends parallel to a surface of the attachment plate where the tubular rail is secured to the attachment plate.

In yet another form, the present disclosure provides a body structure for a vehicle that includes a roof side rail assembly, a vehicle pillar, a pillar reinforcement bracket and an intermediate reinforcement bracket. The roof side rail assembly includes an attachment plate and a tubular rail secured to the attachment plate and configured to extend along a length of the vehicle. The vehicle pillar extends downward from the attachment plate and comprises an inner shell and an outer shell. The pillar reinforcement bracket is at least partially disposed within the vehicle pillar and comprises an upper portion, a body, and a lower portion. The upper portion extends from the body and is secured to an outboard side of the tubular rail. The lower portion extends from the body at an obtuse angle. The intermediate reinforcement bracket is disposed within the vehicle pillar. The intermediate reinforcement bracket comprises a connecting wall and one or more flanges extending from the connecting wall and secured to the outer shell of the vehicle pillar. The connecting wall is secured to the lower portion of the pillar reinforcement bracket. The connecting wall also extends parallel to a surface of the attachment plate where the tubular rail is secured to the attachment plate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-7, a vehicle 10 (FIG. 1) is illustrated having a body structure 14. In some forms, the vehicle 10 can be an electric vehicle such as a battery electric vehicle (BEV). In other examples, the vehicle 10 may be a hybrid electric vehicle (HEV), a plug-in electric vehicle (PHEV), or a fuel cell vehicle, among others. If the vehicle 10 is an electric vehicle, the vehicle 10 includes a battery pack (not shown). The battery pack may be rechargeable and may include lithium-ion batteries or any other suitable electrical power storage units. The battery pack may be disposed at various locations of the vehicle 10 and may be mounted to the vehicle body structure 14. In this way, the battery pack is supported by the vehicle body structure 14 and is remote from a passenger cabin (not shown) and cargo compartments (not shown) of the vehicle 10, therefore, not occupying space that would otherwise be available for passengers or cargo. The battery pack powers a rear motor (not shown) to drive a set of rear wheels (not shown). Similarly, the battery pack powers a front motor (not shown) to selectively drive a set of front wheels (not shown). In some forms, the vehicle 10 may be powered by an internal combustion engine instead of a battery pack.

The vehicle body structure 14 includes a plurality of pillars (e.g., A-pillars 22a, B-pillars 22b, C-pillars 22c), a pair of roof side rail assemblies 24 (only one shown in the figures), rockers (not shown), and a pair of reinforcement assemblies 26 (only one shown in the figures). The A-pillars 22a, the B-pillars 22b, the C-pillars 22c, the rockers and the roof side rail assemblies 24 cooperate to define door openings 31 in the vehicle body structure 14. Doors (not shown) are rotatably coupled to the vehicle body structure 14 between a closed position in which the doors are disposed within the door openings 31 and an open position in which the doors are removed from the door openings 31. Each rocker is elongated and extends along the longitudinal direction of the vehicle 10 at a lower end of the vehicle 10.

Figure 1:
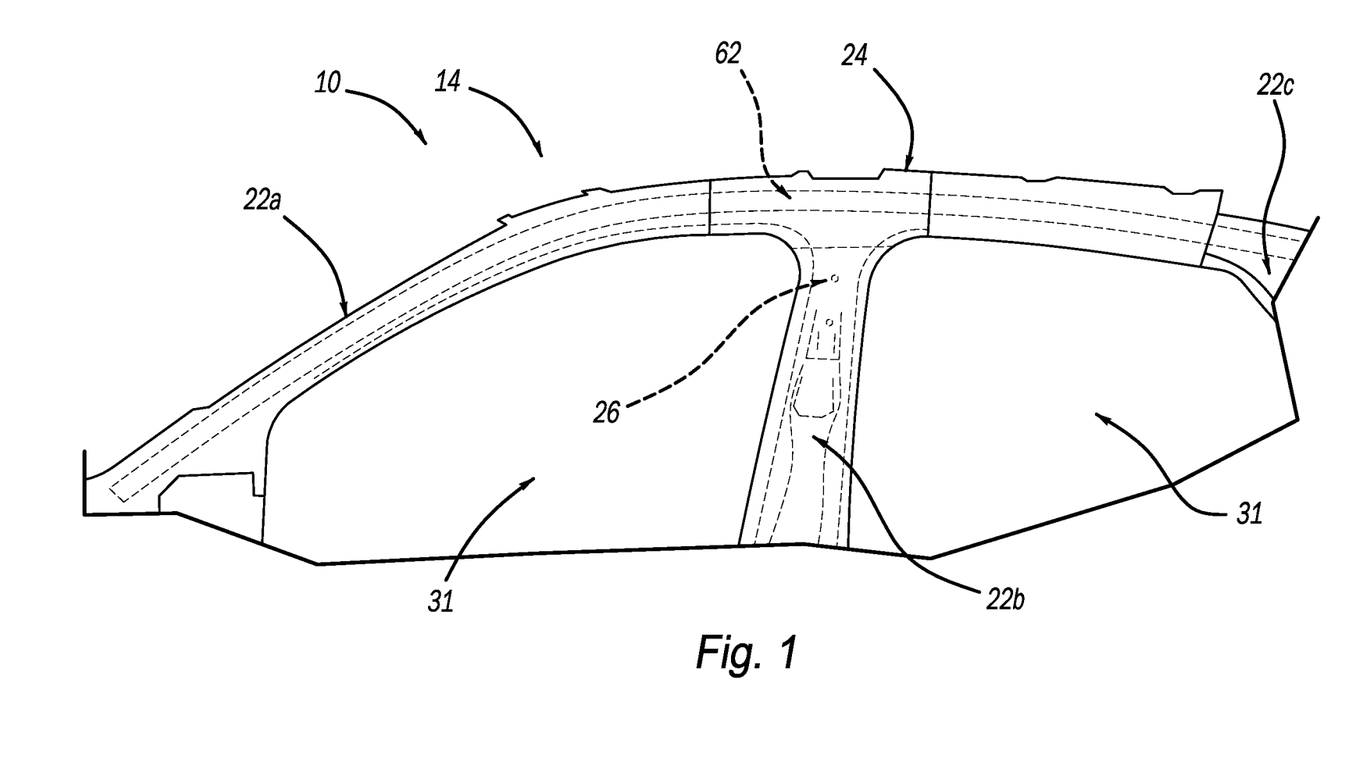
FIG. 1 is a side view of a portion of a vehicle body structure including a reinforcement assembly according to the principles of the present disclosure.
Figure 2:
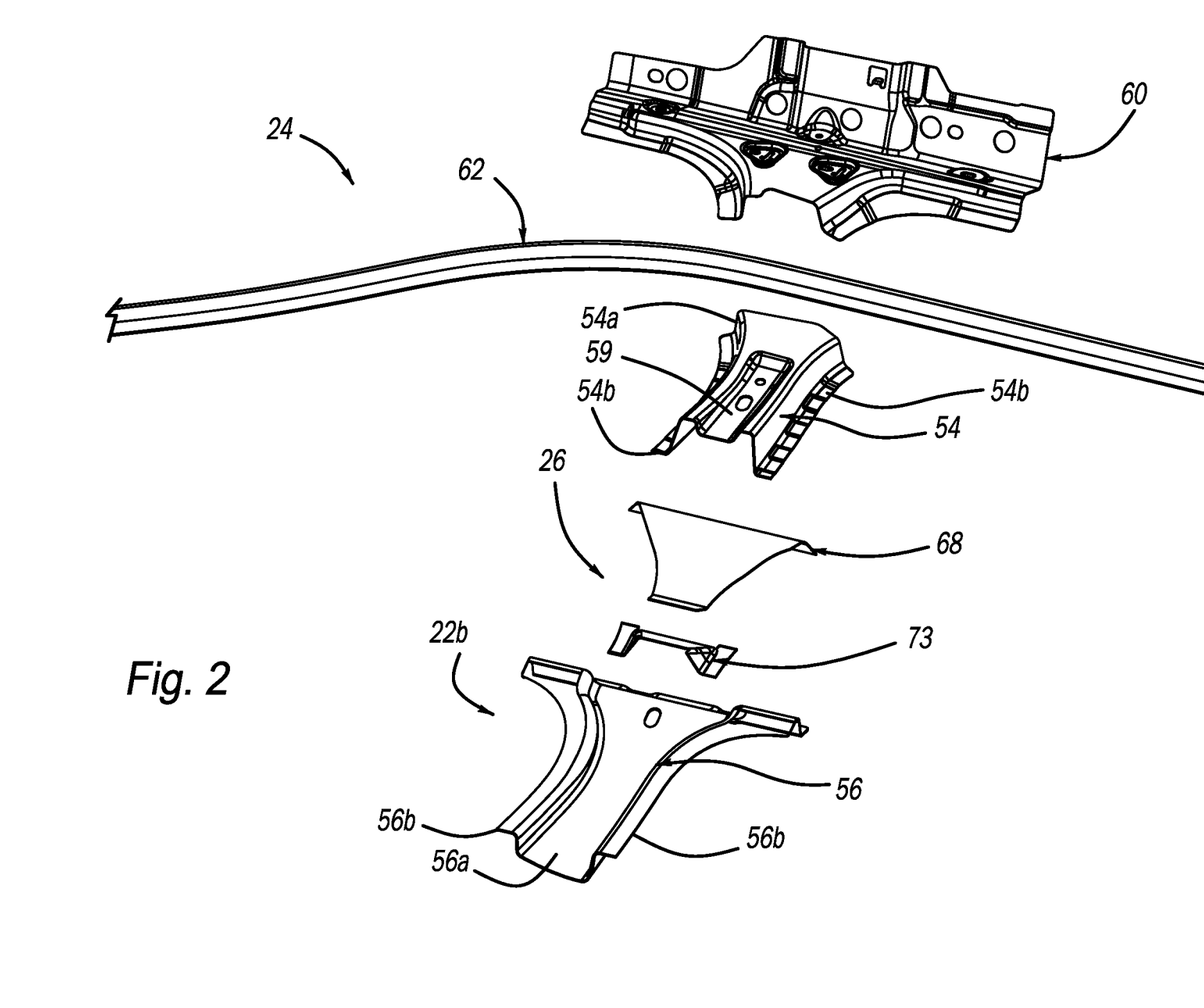
FIG. 2 is an exploded view of a portion of the vehicle body structure of FIG. 1.
Figure 3:
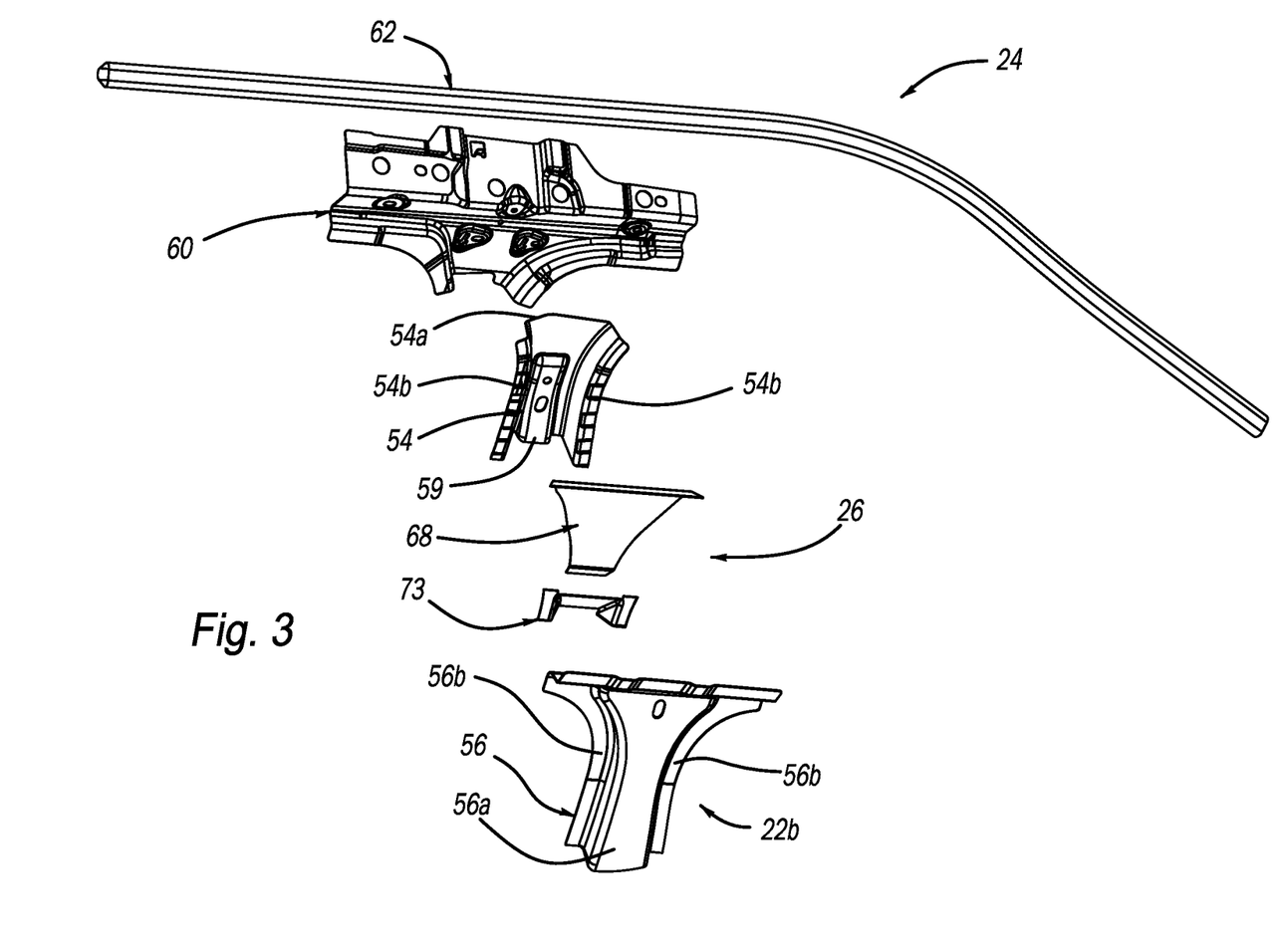
FIG. 3 is another exploded view of a portion of the vehicle body structure of FIG. 1.

Each B-pillar 22b extends downward from a respective roof side rail assembly 24 and comprises an inner shell 54 and an outer shell 56 that cooperate to define a cavity 58 (FIG. 4) housing a respective reinforcement assembly 26. In the example illustrated, the inner shell 54 has a length that is shorter than a length of the outer shell 56. In some forms, the inner shell 54 and the outer shell 56 have the same length. With reference to FIGS. 2 and 3, the inner shell 54 comprises a body 54a and a pair of inner shell flanges 54b that extend generally perpendicular from the body 54a. In the example illustrated, the body 54a has a generally U-shape and comprises a stiffening bead 59 formed therein. In the example illustrated, the stiffening bead 59 extends toward the outer shell 56 when the inner shell 54 and the outer shell 56 are attached to each other. In some forms, the stiffening bead 59 extends away from the outer shell 56 when the inner shell 54 and the outer shell 56 are attached to each other. A seat belt mounting structure 61 (FIG. 4) is fixed to the inner shell 54 at the stiffening bead 59.

The outer shell 56 is fixed to a respective roof side rail assembly 24 and comprises a body 56a and a pair of outer shell flanges 56b that extend generally perpendicular from the body 56a. In the example illustrated, the body 56a has a generally U-shape. In some forms, the body 56a comprises one or more stiffening beads formed therein. The outer shell flanges 56b of the outer shell 56 and the inner shell flanges 54b of the inner shell 54 are welded to each other, thereby fixing the inner shell 54 and the outer shell 56 to each other and defining the cavity 58.

The pair of roof side rail assemblies 24 are positioned at opposing sides of the vehicle 10 and each include an L-shaped attachment or inner plate 60 and a side rail 62. In the example illustrated, the inner plate 60 extends a first portion of the length of the side rail 62 and is fixed to the inner shell 54 of the B-pillar 22b and brackets extend a second portion of the length of the rail 62. In some forms, the inner plate 60 extends majority of the length of the rail 62. The outer shell 56 of the B-pillar 22b wraps around the rail 62 and is fixed to the inner plate 60. The rail 62 extends along a length of the vehicle 10 at an upper portion of the vehicle 10 and is fixed at known positions at or near opposing ends thereof. The rail 62 is welded to the inner plate 60 along an inboard portion 64 of the rail 62 (i.e., the inboard portion 64 of the rail 62 faces toward an occupant cabin of the vehicle 10). The rail 62 is also spaced apart from the outer shell 56 of the B-pillar 22b and is housed in one or more vehicle components such as vehicle shells, brackets, and/or plates extending a longitudinal direction of the vehicle 10. In the example illustrated, the inner plate 60 and the outer shell 56 of the B-pillar 22b cooperate to house at least a portion of the rail 62. In the example illustrated, the rail 62 is a tubular member having a generally triangular shape and the inboard portion 64 of the rail 62 is an inboard side of the triangular shape rail 62. In some forms, the rail 62 is a tubular member comprising four (4) or more sides. In other forms, the rail 62 is a tubular member having a generally circular shape.

Figure 4:
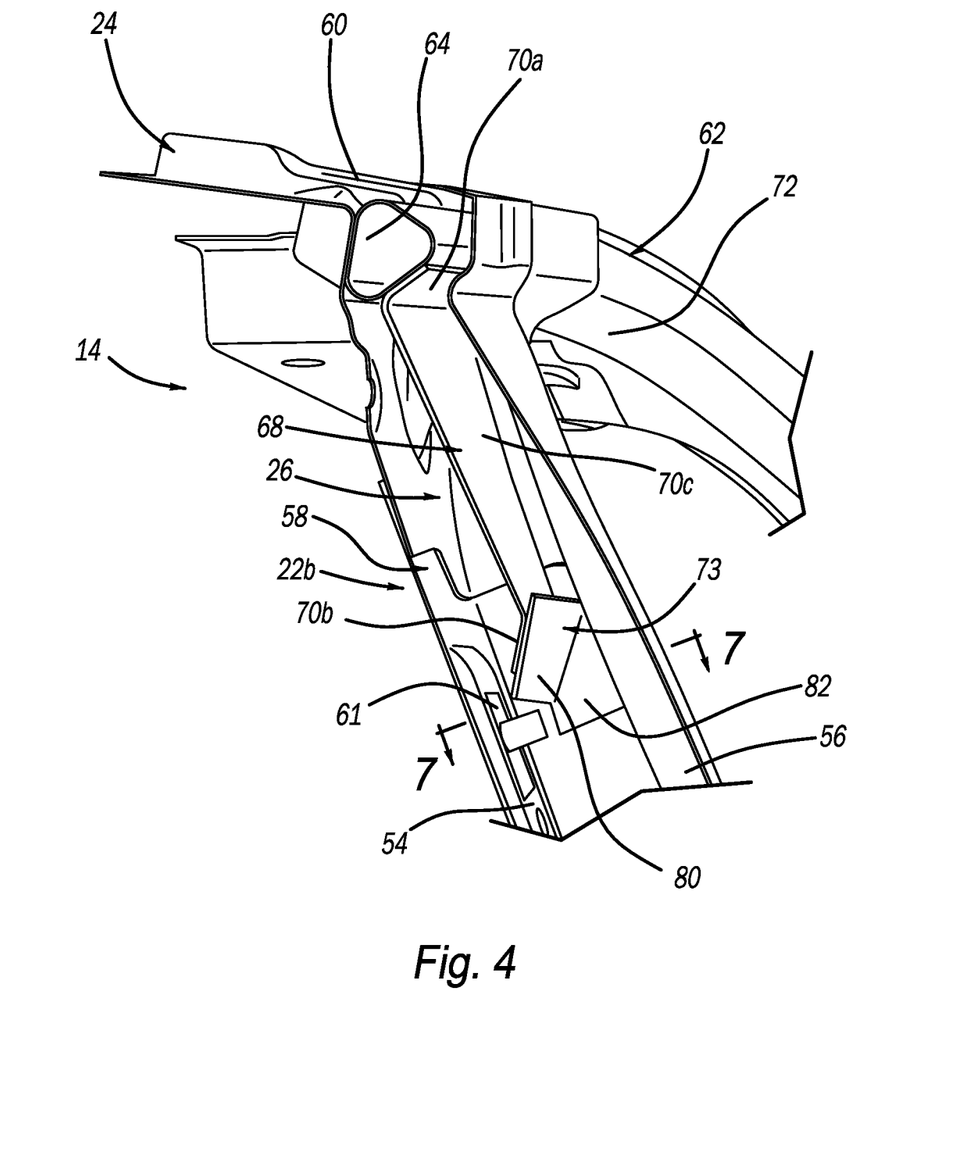
FIG. 4 is a partial cross-sectional view of a vehicle pillar of the vehicle body structure of FIG. 1.
Figure 5:
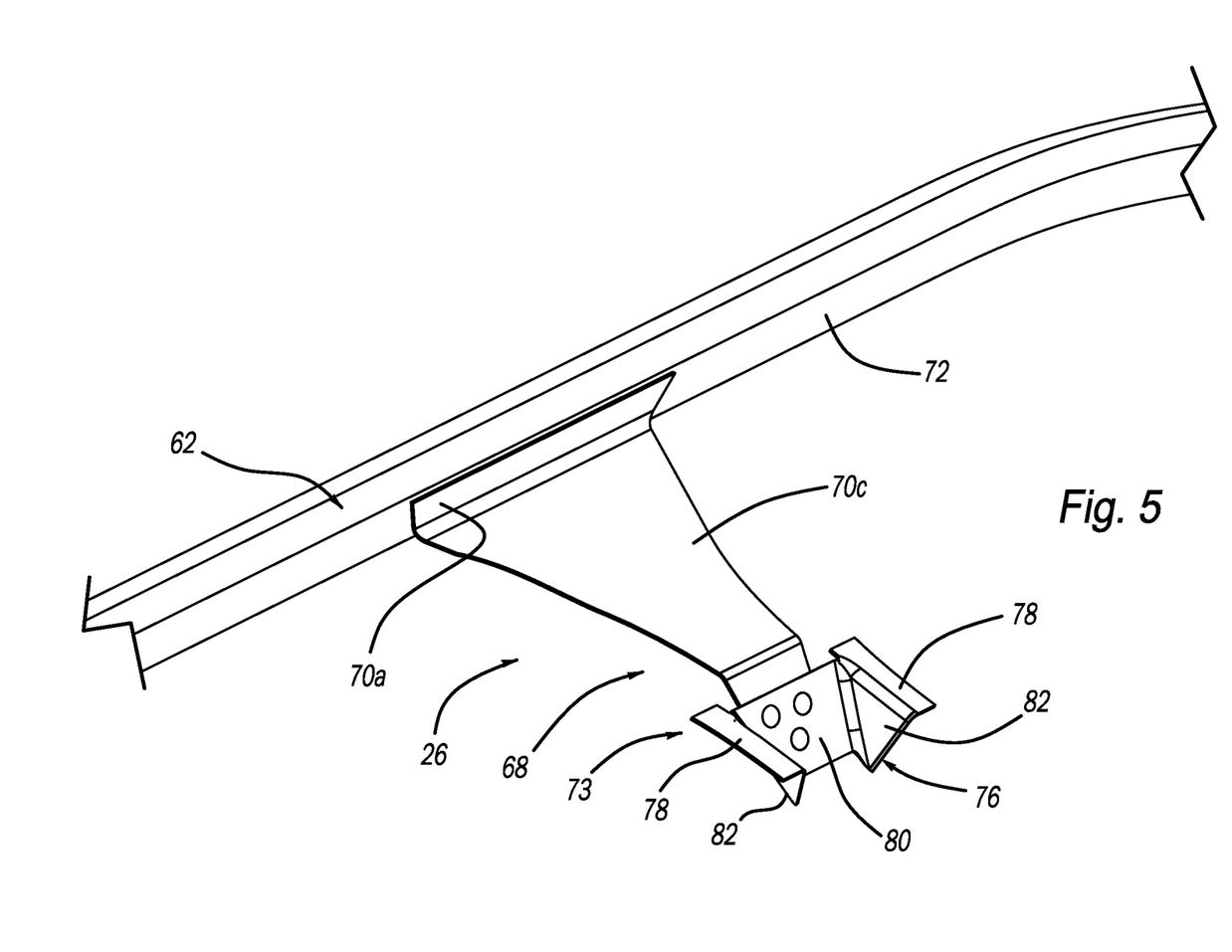
FIG. 5 is a perspective view of the reinforcement assembly of FIG. 1 fixed to a rail of the vehicle body structure with the vehicle pillar removed for clarity.
Figure 6:
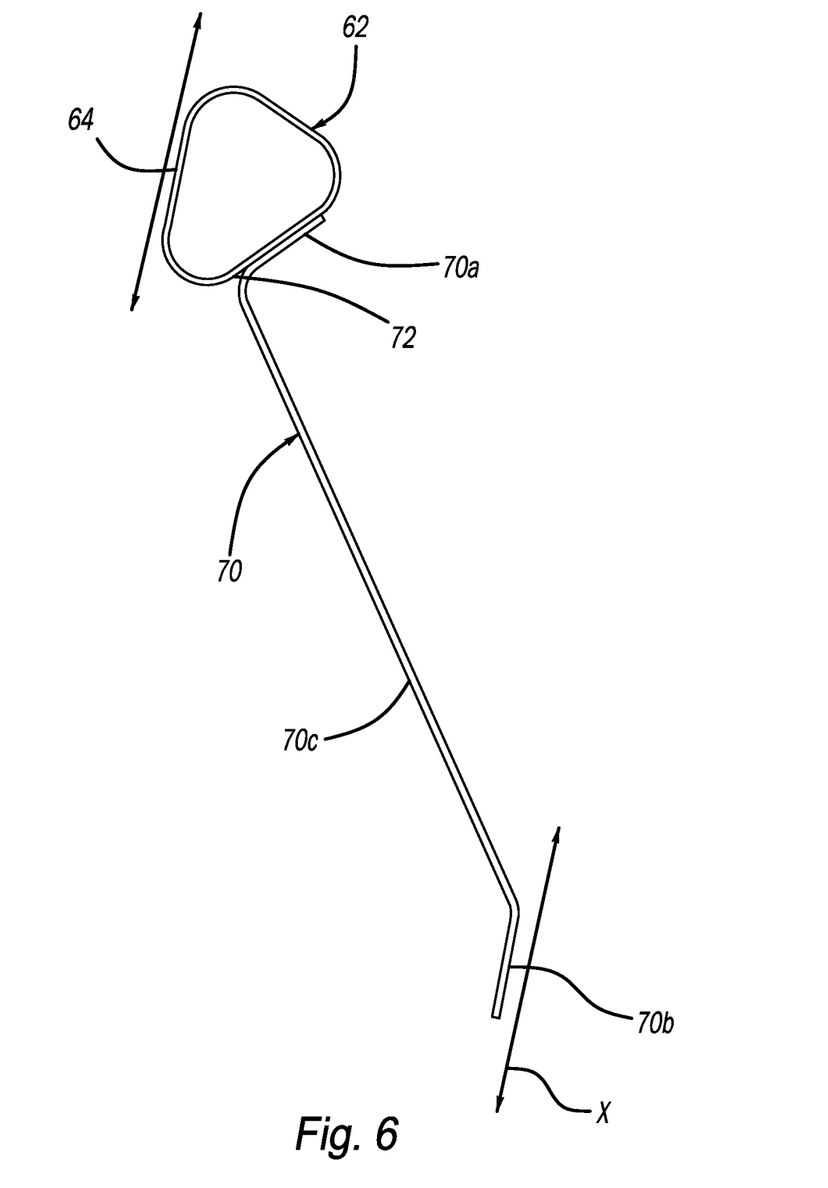
FIG. 6 is a cross-sectional view of the reinforcement assembly of FIG. 1 fixed to the rail of the vehicle body structure with the vehicle pillar removed for clarity.

As shown in FIG. 4, each reinforcement assembly 26 is disposed at least partially into the B-pillar 22b and provides a connection between the rail 62 and the B-pillar 22b. Stated different, each reinforcement assembly 26 is secured to the rail 62 and the B-pillar 22b. In this way, during a vehicle impact event, a load from a vehicle component such as a roof of the vehicle is transferred to the B-pillar 22b. Each reinforcement assembly 26 includes a pillar reinforcement bracket 68 and an intermediate reinforcement bracket 73. With reference to FIGS. 4-7, the pillar reinforcement bracket 68 is fixed to the rail 62 and at least partially disposed within the B-pillar 22b. The pillar reinforcement bracket 68 comprises an upper portion or flange 70a, a lower portion or flange 70b, and a body 70c. The upper portion 70a extends outwardly (i.e., away from an occupant cabin of the vehicle 10) from a first end of the body 70c and is fixed to a lower, outboard side 72 of the rail 62. In some forms, the upper portion 70a extends outwardly from the first end of the body 70c at a perpendicular angle. In other forms, the upper portion 70a extends outwardly from the first end of the body 70c at an obtuse or acute angle. The lower portion 70b extends inwardly (i.e., toward an occupant cabin of the vehicle 10) from a second end of the body 70c and is fixed to the intermediate reinforcement bracket 73. In the example illustrated, the lower portion 70b extends inwardly from the second end of the body 70c at an obtuse angle. The surface area of the upper portion 70a is greater than the surface area of the lower portion 70b.

The body 70c extends along a length of the B-pillar 22b and is tapered from the first end toward the second end. In this way, the body 70c takes up minimal space in the B-pillar 22b providing for improved packaging. In some forms, the body 70c includes access holes that facilitate assembly of various components of the roof side rail assembly 24 such as assembly of the inner plate 60 and the rail 62 to each other.

The intermediate reinforcement bracket 73 is disposed within the B-pillar 22b and is secured to the pillar reinforcement bracket 68 and the outer shell 56 of the B-pillar 22b. In this way, the reinforcement assembly 26 connects the rail 62 to the B-pillar 22b, which provides load transfer from the rail 62 to the B-pillar 22b during a vehicle impact event. In some forms, the intermediate reinforcement bracket 73 is secured to the inner shell 54 of the B-pillar 22b or is secured to both the inner and outer shells 54, 56 of the B-pillar 22b. The intermediate reinforcement bracket 73 comprises a body 76 and a pair of flanges 78 extending from the body 76. In the example illustrated, the body 76 has a U-shape and comprises a connecting wall 80 and side walls 82 extending downward from opposing sides of the connecting wall 80.

Figure 8:
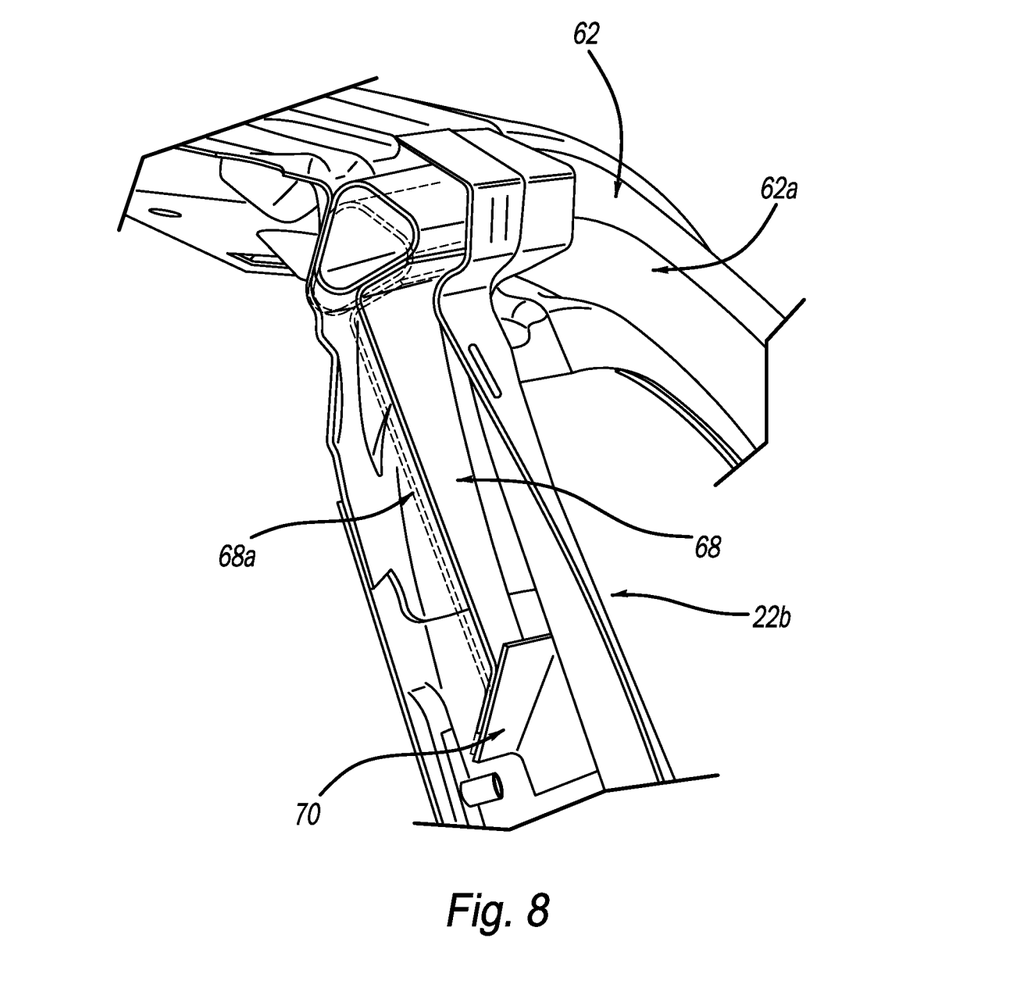
FIG. 8 is a partial cross-sectional view of the vehicle pillar of the vehicle body structure of FIG. 1 showing a first rail with no tolerance variation and a second rail having some tolerance variation.

The connecting wall 80 is fixed to the lower portion 70b of the pillar reinforcement bracket 68 and extends toward the inner shell 54 at an angle. Stated differently, the connecting wall 80 extends in a direction parallel to the inboard portion 64 of the rail 62 that is fixed to the inner plate 60. In this way, tolerance variation of the rail 62, which occurs along the direction parallel to the connecting wall 80 (i.e., along line X), still allows for connection of the reinforcement assembly 26 to the B-pillar 22b without displacing the inner and outer shells 54, 56 of the B-pillar 22b. That is, as shown in FIG. 8, rail 62a in an out of tolerance position allows for pillar reinforcement bracket 68a to be fixed to the intermediate reinforcement bracket 73 (allows for the lower portion of the pillar reinforcement bracket 68a to be fixed to the connecting wall 80 of the intermediate reinforcement bracket 73) without displacing the B-pillar 22b. Stated differently, tolerances describe acceptable variation away from the nominal position. The rail 62a is in an out of nominal position or a maximum variation position relative to rail 62 in the nominal position. In this way, the reinforcement assembly 26 of the present disclosure allows for more variation, which allows for greater tolerances of the rail 62 relative to the nominal position. The surface area of the connecting wall 80 is greater than the surface area of the lower portion 70b of the pillar reinforcement bracket 68.

Figure 7:
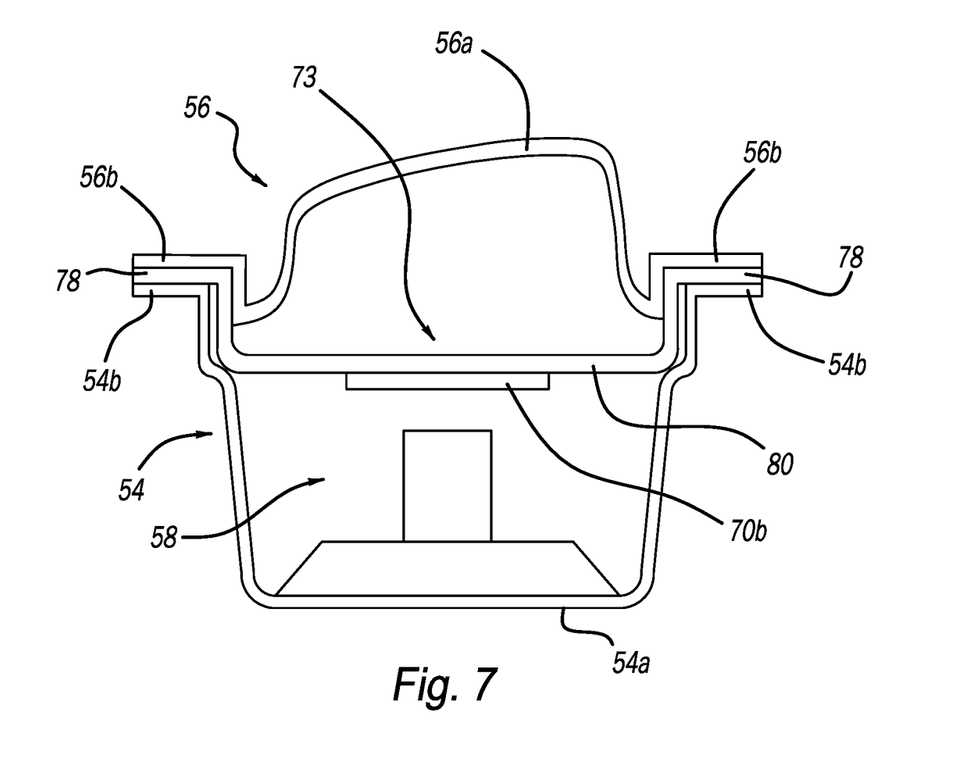
FIG. 7 is a cross-sectional view of the reinforcement assembly of FIG. 1 attached to the vehicle pillar.

The pair of flanges 78 correspond to a portion of the outer shell 56 and are fixed to an inside surface of the portion of the outer shell 56 by welding. As shown in FIG. 7, the pair of flanges 78 correspond to portions of the inner and outer shells 54, 56. Stated differently, the pair of flanges 78 are disposed between and fixed to the pair of inner shell flanges 54b and the pair of outer shell flanges 56b. In some forms, the pair of flanges 78 are fixed to the body 56a of the outer shell 56 instead of being disposed between and fixed to the pair of inner shell flanges 54b and the pair of outer shell flanges 56b.

The reinforcement assembly 26 of the present disclosure allows for tolerance variation of the rail 62 while still providing connection of the reinforcement assembly 26 to the B-pillar 22b without displacing the inner and outer shells 54, 56 of the B-pillar 22b. This, is turn, provides for load distribution from a vehicle component such as a roof to the B-pillar 22b during an impact event. Although the reinforcement assembly 26 of the present disclosure is shown associated with the B-pillar 22b, it should be understood that the reinforcement assembly 26 of the present disclosure may also be associated with other components of the vehicle such as other vehicle pillars (e.g., A-pillar, C-pillar, or D-pillar) without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A body structure for a vehicle, the body structure comprising:
    a roof side rail assembly comprising an attachment plate and a rail secured to the attachment plate and configured to extend along a length of the vehicle;
    a vehicle pillar extending downward from the attachment plate;
    a pillar reinforcement bracket secured to the rail and at least partially disposed within the vehicle pillar, the pillar reinforcement bracket comprising a lower portion; and
    an intermediate reinforcement bracket disposed within and secured to the vehicle pillar, the intermediate reinforcement bracket comprising a connecting wall that is secured to the lower portion of the pillar reinforcement bracket, the connecting wall extending parallel to a surface of the attachment plate where the rail is secured to the attachment plate.

2. The body structure of claim 1, wherein the vehicle pillar comprises an outer shell and an inner shell, and wherein the rail is spaced apart from the outer shell.

3. The body structure of claim 2, wherein:
    the outer shell comprises a body and a pair of outer shell flanges extending from the body;
    the inner shell comprises a body and a pair of inner shell flanges extending from the body; and
    the intermediate reinforcement bracket comprises a pair of bracket flanges extending from the connecting wall, the pair of bracket flanges disposed between and fixed to the pair of inner shell flanges and the pair of outer shell flanges.

4. The body structure of claim 2, wherein the pillar reinforcement bracket is secured to an outboard side of the rail.

5. The body structure of claim 2, wherein the intermediate reinforcement bracket comprises one or more flanges extending from the connecting wall and secured to the outer shell.

6. The body structure of claim 2, wherein the pillar reinforcement bracket is secured to an outboard side of the rail, and wherein the intermediate reinforcement bracket comprises one or more flanges extending from the connecting wall and secured to the outer shell.

7. The body structure of claim 1, wherein the pillar reinforcement bracket further comprises a body and an upper portion, and wherein the upper portion extends outward from a first end of the body and the lower portion extends inward from a second end of the body.

8. The body structure of claim 7, wherein the lower portion extends inward at an obtuse angle relative to the body.

9. The body structure of claim 7, wherein the body is tapered from the first end toward the second end.

10. The body structure of claim 1, wherein the vehicle pillar is a B-pillar.

11. The body structure of claim 1, wherein the rail is a tubular member having a triangular shape.

12. The body structure of claim 1, wherein the rail is a tubular member comprising an inboard side and an outboard side, and wherein the inboard side is secured to the attachment plate and the outboard side is secured to the pillar reinforcement bracket.

13. A body structure for a vehicle, the body structure comprising:
   a roof side rail assembly comprising an attachment plate and a tubular rail secured to the attachment plate and configured to extend along a length of the vehicle;
   a vehicle pillar extending downward from the attachment plate;
   a pillar reinforcement bracket at least partially disposed within the vehicle pillar and comprising an upper portion, a body, and a lower portion, the upper portion extending from the body and secured to the tubular rail, the lower portion extending from the body at an obtuse angle; and
   an intermediate reinforcement bracket disposed within and secured to the vehicle pillar, the intermediate reinforcement bracket comprising a connecting wall that is secured to the lower portion of the pillar reinforcement bracket, the connecting wall extending parallel to a surface of the attachment plate where the tubular rail is secured to the attachment plate.

14. The body structure of claim 13, wherein the vehicle pillar comprises an outer shell and an inner shell, and wherein the tubular rail is spaced apart from the outer shell.

15. The body structure of claim 14, wherein the upper portion of the pillar reinforcement bracket is secured to an outboard side of the rail.

16. The body structure of claim 14, wherein the intermediate reinforcement bracket comprises one or more flanges extending from the connecting wall and secured to the outer shell.

17. The body structure of claim 14, wherein the upper portion of the pillar reinforcement bracket is secured to an outboard side of the tubular rail, and wherein the intermediate reinforcement bracket comprises one or more flanges extending from the connecting wall and secured to the outer shell.

18. The body structure of claim 13, wherein the upper portion of the pillar reinforcement bracket extends outward from a first end of the body and the lower portion of the pillar reinforcement bracket extends inward from a second end of the body.

19. The body structure of claim 18, wherein the body is tapered from the first end toward the second end.

20. A body structure for a vehicle, the body structure comprising:
   a roof side rail assembly comprising an attachment plate and a tubular rail secured to the attachment plate and configured to extend along a length of the vehicle;
   a vehicle pillar extending downward from the attachment plate and comprising an inner shell and an outer shell;
   a pillar reinforcement bracket at least partially disposed within the vehicle pillar and comprising an upper portion, a body, and a lower portion, the upper portion extending from the body and secured to an outboard side of the tubular rail, the lower portion extending from the body at an obtuse angle; and
   an intermediate reinforcement bracket disposed within the vehicle pillar, the intermediate reinforcement bracket comprising a connecting wall and one or more flanges extending from the connecting wall and secured to the outer shell of the vehicle pillar, the connecting wall is secured to the lower portion of the pillar reinforcement bracket, the connecting wall also extending parallel to a surface of the attachment plate where the tubular rail is secured to the attachment plate.

* * * * *